May 26, 1959 E. D. GEORGE 2,888,059
METHOD OF AND APPARATUS FOR MANUFACTURING BUTYL INNER TUBES
Filed Nov. 16, 1954 2 Sheets-Sheet 1

INVENTOR.
EVERETT D. GEORGE
BY
*R. L. Miller*
ATTORNEY

May 26, 1959 E. D. GEORGE 2,888,059
METHOD OF AND APPARATUS FOR MANUFACTURING BUTYL INNER TUBES
Filed Nov. 16, 1954 2 Sheets-Sheet 2

INVENTOR.
EVERETT D. GEORGE
BY
ATTORNEY

United States Patent Office 2,888,059
Patented May 26, 1959

2,888,059
METHOD OF AND APPARATUS FOR MANUFACTURING BUTYL INNER TUBES

Everett D. George, Cuyahoga Falls, Ohio, assignor to The Goodyear Tire & Rubber Company, Akron, Ohio, a corporation of Ohio Application November 16, 1954, Serial No. 469,209

8 Claims. (Cl. 154—14)

This application relates to an improvement in the method of fabricating inner tubes, airbags, and similar torus-shaped inflatable articles made from synthetic rubber. The manufacture of inner tubes at the present time quite generally utilizes continuous extruding machinery in which unvulcanized rubber, having incorporated therein the necessary vulcanizing agents, accelerators, antioxidants, and pigments, is fabricated into a continuous tube. The sections of the continuous tube are then cut into desired lengths while the tube is in a flat position and the ends thereof spliced together to form a closed, sealed structure. A suitable mechanical air valve is inserted at the desired point and the entire unit is vulcanized by heating at a suitable temperature for the necessary length of time to produce an inflatable torus-shaped article.

In the prior art method, which is quite satisfactory in the fabrication of natural rubber tubes, the uncured inner tube is placed in a mold having an interior surface of the identical size and shape desired in the finished inner tube. The uncured inner tube is then inflated with air or other suitable gas to stretch or otherwise force the inner tube against the interior mold surface. However, with the advent of inner tubes made of synthetic rubber, and more particularly Butyl rubber, it was found that the splice of the butyl tube would tear apart or otherwise become defective due to the lack of cohesive strength. In order to overcome the inherent disadvantages of Butyl rubber, the prior art discloses several methods of fabricating tubes of Butyl rubber employing either the step of binding the spliced area with tape or cooling the spliced area prior to inflation of the unvulcanized tube. However, the methods employing tape are economically unfeasible because of the many hand operations involved; and, furthermore, the spliced area of the tube is embossed by the tape during cure. The methods employing the step of cooling the spliced area prior to cure are extremely costly due to the additional capital investment and additional labor involved.

It is, therefore, among the objects of this invention to provide a method of treating inner tubes which prevents separation of the tube splice.

A further object of the invention is to provide a method and apparatus for treating butyl tubes which may be economically and expeditiously practiced and which will permit the use of synthetic rubber compositions which in the unvulcanized state have relatively low adhesion properties.

The term "Butyl rubber" as used in this specification is defined as, any rubber composition employing synthetic rubber including synthetic rubbers made of butadiene/ isobutylene copolymer compositions or isoprene/isobutylene copolymer compositions.

Other objects and advantages of the present invention will appear more fully as the description of the drawings proceeds, in which.

Figure 1:
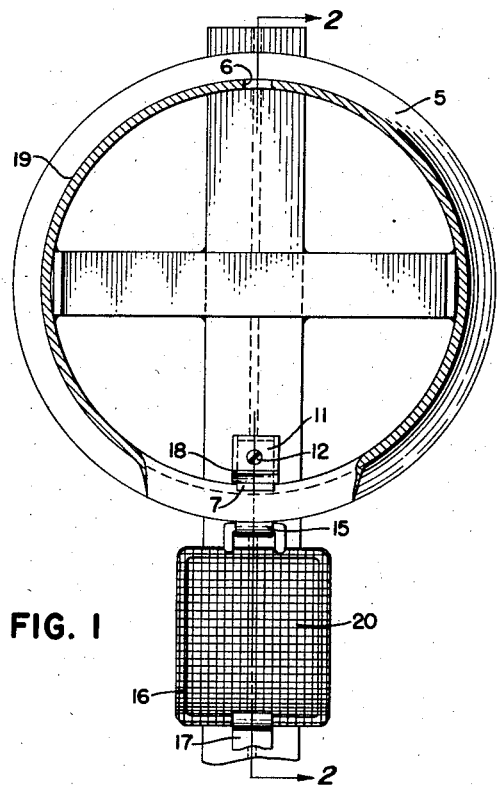
Fig. 1 is a side elevational view of the apparatus of the present invention.
Figure 2:
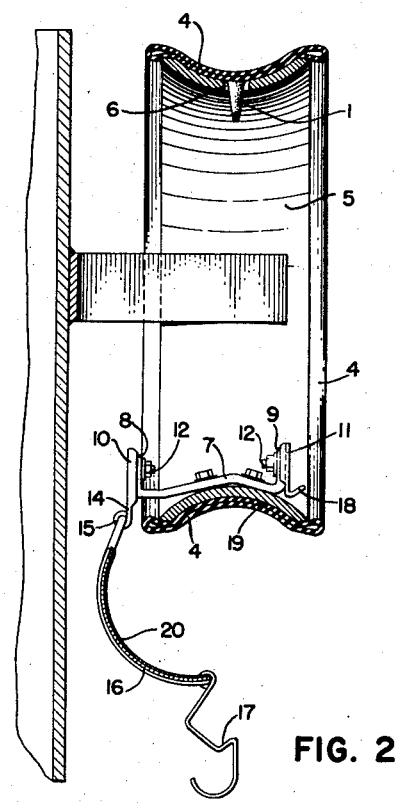
Fig. 2 is a cross section taken along the lines 2—2 of Fig. 1 with the uninflated, unvulcanized tube mounted thereon.

The improved method of manufacturing inner tubes of Butyl rubber utilized most of the conventional operations and apparatus. Butyl rubber is extruded in the usual fashion and cut to a predetermined length. A valve hole is punched at a fixed distance from the ends of the tube and a suitable valve 1 adhered to the tube in alignment with the valve hole. The ends of the cut lengths of Butyl rubber tubing are then butted together while the tube is in a flat position to form a splice or joint 3 transversely of the tube, using any of the many types of splicing machinery available in the art, to form a continuous ring-shaped tube 4, as shown in Fig. 2. In accordance with this invention, the spliced, unvulcanized tube 4 is placed upon a supporting ring 5 having a suitable hole 6 through which the valve 1 is inserted. Since the splice 3 is located a fixed distance circumferentially from the valve 1, the spliced area will thus be located a constant distance circumferentially from the hole 6 in the ring 5. At the spliced area, a bracket 7 is bolted or otherwise secured to the inner surface of the ring 5. The bracket extends transversely of the ring 5 and is provided with extensions 8 and 9 projecting substantially radially inward relative to the ring 5. Slide bars 10 and 11 are adjustably secured to the extensions 8 and 9 respectively by means of bolts 12, 12. The bars 10 and 11 have longitudinally extending guides 13, 13 which bear against the lateral edges of the extensions 8 and 9 to provide lateral stability to the slide bars 10 and 11. The slide bars 10 and 11 may, therefore, be adjusted longitudinally relative to the extensions 8 and 9. The outer end 14 of the bar 10 is provided with a hinge 15 to which is pivotably secured a retaining frame 16. An arm 17 is rigidly secured to the frame 16 for engagement with a latch 18 which is integrally formed with the slide bar 11.

The supporting or inflating ring 5 is arcuately shaped in cross section and the tube-contacting surface 19 of the ring 5 is curved in the same general direction as the inflated tube. However, the radius of curvature of the surface 19 is substantially greater than the radius of curvature of the inflated tube. Likewise, in cross section the plane of the retaining frame 16 and the restraining surface 20 are arcuate in shape and have a radius of curvature substantially larger than the radius of curvture of the inflated tube. The non-stretchable restraining surface 20 is secured to the frame 16 and thereby held in the same arcuate plane as the frame.

With the spliced, unvulcanized and uninflated tube 4 placed upon the supporting ring 5, as shown in Fig. 2, the splice 3 is located a fixed distance circumferentially from the valve 1, as previously indicated, and the bracket 7 is likewise attached to the ring 5 an equal circumferential distance from valve hole 6 so that the restraining surface 20 overlays the splice 3. The distance between the contacting surface 19 of the ring 5 and the restraining surface 20 is adjusted by moving the slide bars 10 and 11 relative to the extensions 8 and 9 so that for a given tube size the distance between the surfaces 19 and 20 is substantially less than the diameter of the inflated tube in a plane passing at right angles to the axis of the ring 5 and midway between the edges of the ring 5. The distance between the surfaces 19 and 20 is 70% to 97% of the diameter of the inflated tube; and, preferably, approximately 93%.

Figure 4:
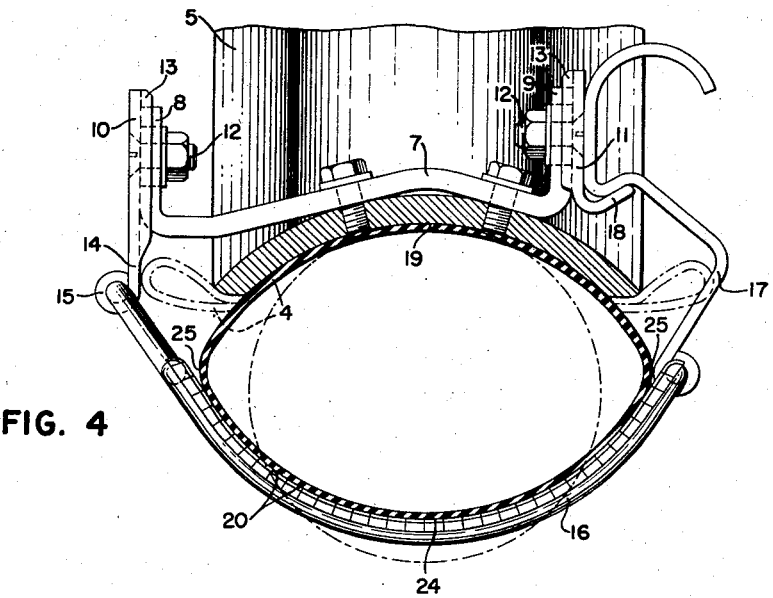
Fig. 4 is a cross-sectional view taken along the lines 4—4 of Fig. 3.
Figure 5:
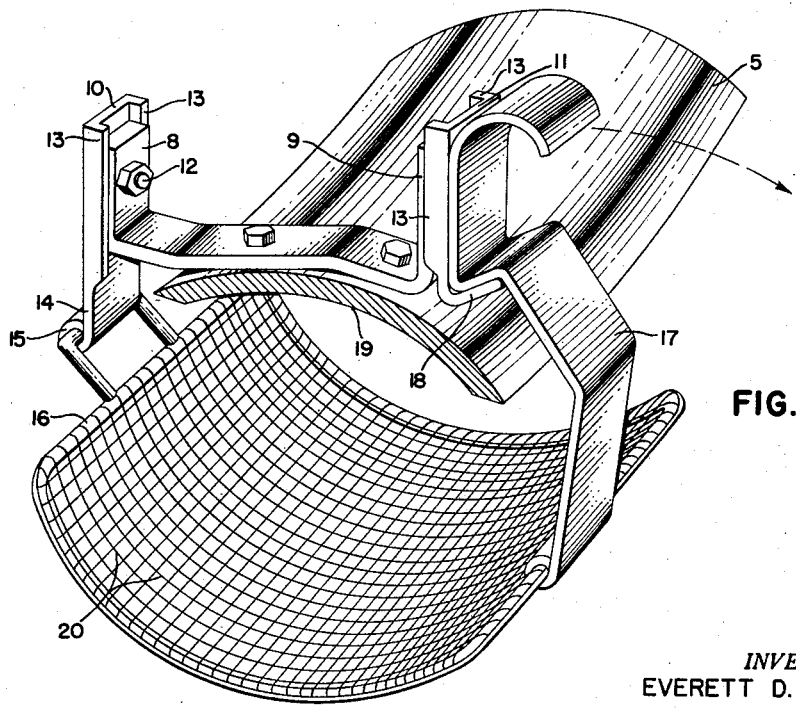
Fig. 5 is an isometric view of the apparatus with parts broken away showing the apparatus in closed position.

After the tube is positioned upon the inflating ring 5, the tube is inflated by means of an air hose 21 having a suitable outlet valve 22 and clamp 23 for holding the valve 22 on the tube valve 1. The orifice of the valve 22 is so adjusted that air is admitted to the tube at a relatively slow rate. After the tube is partially inflated, the tread or crown portion 24 of the tube 1 in the spliced area contacts the surface 20 and is restrained from further expansion in a radial direction. Further inflation of the tube results in expansion of the sidewall portions 25 of the tube so that, as the tube approaches its fully inflated condition, the cross section of the tube in the spliced area is restricted into a substantially elliptical or oval shape between surfaces 19 and 20, as shown in Fig. 4.

Furthermore, as indicated, the surface 20 is made of a non-stretchable, highly-perforated material, preferably quarter-inch metal mesh. As the spliced area of the tube expands during inflation against the surface 20, the unvulcanized rubber of the tube is forced into the interstices of the surface 20 which prevents the spliced area from being stretched circumferentially and holds the edges of the joint in close contacting engagement.

Figure 3:
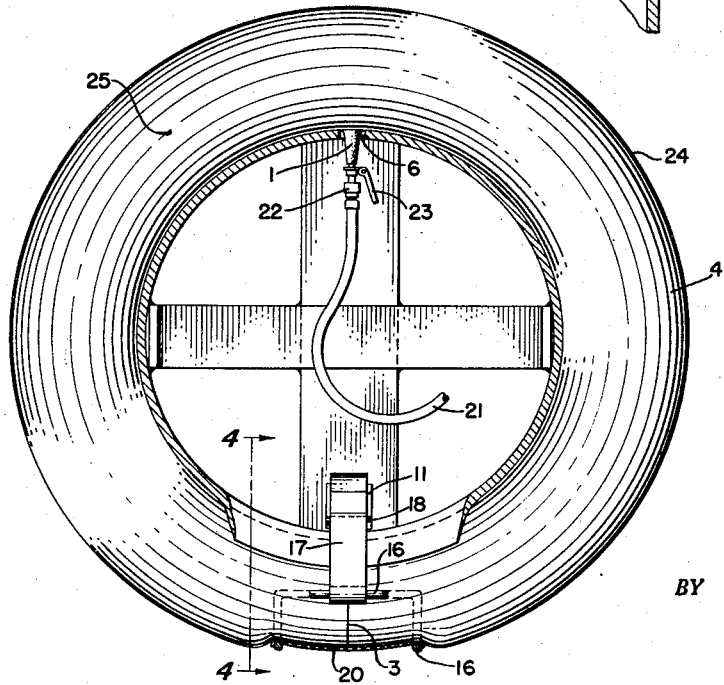
Fig. 3 is a side elevational view similar to Fig. 1 with the unvulcanized tube inflated and mounted on the apparatus.

The tube 4 is maintained in substantially fully inflated position on the ring 5 as shown in Fig. 3 for a period of time sufficient to permit the circumferential and radial stresses in the area adjacent the splice 3 to be equalized. The minimum time is, of course, dependent upon the particular compound, the inflationary air pressure, and the temperature of the tube when inflated; but, in any event, for a period of time necessary to permit flow of the stock in the spliced area so as to sustain the elliptical deformation of the cross section until the tube can be cured. Preferably the tube is maintained upon the supporting ring with the spliced area restricted as shown in Fig. 4 for at least approximately 30 seconds, and preferably 4 or 5 minutes. After the tube has been held in the deformed position for approximately 30 seconds or more, the arm 17 is unlatched from the latch 18 and permitted to fall by gravity about the pivot of hinge 15 so that the inflated, deformed tube may be removed from the ring 5. Thereafter, the tube is placed in a curing mold and cured at the proper temperature and pressure for a sufficient time to effect permanent cure. Since the curing pressure is greater than the pressure maintained on the ring 5, and the sidewalls of the curing mold initially contact the sidewalls of the tube in the splice area, the elliptical section at the spliced area is readily conformed to the circular cross section of the curing mold.

It is, therefore, believed apparent that this invention provides a novel method of treating inner tubes which substantially eliminates defective tubes and results in many economies over former methods. The improved results are possible because in the present method the crown portion of the splice section of the tube is not permitted to expand radially or circumferentially to the same extent as the remainder of the tube. Therefore, the forces exerted by the inflationary air pressure on the crown in the area of the joint are substantially less than in the remaining crown area, and the joint area of the crown is prevented from stretching circumferentially by the perforated surface 20 until the rubber in the spliced area reaches a state of equilibrium. The spliced area will then hold its elliptical shape until additional forces are applied. Surprisingly, as the rubber in the spliced area is thereafter expanded to its full radius by compression in the curing mold and increased air pressure, it is found that the adhesion of the joint in the crown can then sustain the increased stresses and the joint will not tear apart or develop defects.

While certain representative embodiments and details have been shown for the purpose of illustrating the invention, it will be apparent to those skilled in this art that various changes and modifications may be made therein without departing from the spirit or scope of the invention.

I claim:

1. A method of manufacturing Butyl rubber inflatable toroidal shaped articles comprising the steps of forming a length of tubular stock of Butyl rubber, cutting said stock to the desired length while the stock is in a flat position, butting the flattened ends of said cut stock together to form a spliced flat tube, placing the spliced area of the flat tube between surfaces spaced apart a distance substantially less than the sectional diameter of the inflated tube, inflating the flat tube with the spliced area positioned between said surfaces so that as the tube expands the crown portion of the spliced area engages one of said surfaces and said area is held in an elliptical cross sectional shape having a diameter from the crown portion to rim portion smaller than the inflated diameter of the tube, maintaining the spliced area between said surfaces until the stock in the spliced area has stabilized, removing the spliced area from engagement with said surfaces, placing the inflated tube in a mold and curing the tube in said mold.

2. A method as claimed in claim 1 in which the spliced area is maintained between said surfaces for at least 30 seconds after inflation thereof.

3. A method of manufacturing Butyl rubber inflatable toroidal shaped articles comprising the steps of forming a length of tubular stock of Butyl rubber, cutting said stock to the desired length while the stock is in a flat position, butting the flattened ends of said cut stock together to form a spliced flat tube, inflating the flat tube, holding the spliced area of the tube during inflation between a pair of surfaces respectively contacting the rim and crown portions of the spliced area, said surfaces being spaced apart a distance substantially less than the sectional diameter of the inflated tube, whereby the spliced area is prevented from expanding in a radial direction to the sectional diameter of the inflated tube, maintaining the spliced area between said surfaces until the stock in the spliced area has stabilized, removing the spliced area from engagement with said surfaces, placing the inflated tube in a mold and curing the tube in said mold.

4. An apparatus for inflating spliced tubes prior to cure comprising in combination a supporting ring for circumferentialy engaging the rim area of the spliced tube with the axis of the ring coincident with the axis of the tube, said ring having an aperture through which the valve tube projects, means for inflating the tube, a surface radially spaced outwardly from said ring a distance less than the sectional diameter of the cured tube for restricting radial expansion of only the crown portion of the spliced area of the tube, said restricting surface being arcuately shaped in an axial plane relative to the ring, said restricting surface having a radius of curvature in said plane larger than the sectional radius of the cured tube.

5. An apparatus for inflating spliced tubes as claimed in claim 4 in which said restricting surface is perforated.

6. An apparatus as claimed in claim 5 in which said restricting surface comprises a non-stretchable mesh contacting the crown portion of the spliced area of the tube.

7. An apparatus as claimed in claim 4 in which said restricting surface is supported for movement toward and away from said supporting ring to permit the tube to be mounted on said supporting ring.

8. An apparatus as claimed in claim 7 in which the means for supporting said restricting surface is secured to said ring.

(References on following page)

References Cited in the file of this patent

UNITED STATES PATENTS

| | | |
|---|---|---|
| 1,637,465 | Bierman | Aug. 2, 1927 |
| 1,963,013 | Breth | June 12, 1934 |
| 2,430,630 | Davis | Nov. 11, 1947 |
| 2,454,666 | Morris | Nov. 23, 1948 |
| 2,510,715 | Peterson et al. | June 6, 1950 |
| 2,559,591 | Burkley | July 10, 1951 |
| 2,565,703 | Strong | Aug. 28, 1951 |
| 2,647,555 | Hinman | Aug. 4, 1953 |

OTHER REFERENCES

"Symposium on the Applications of Synthetic Rubbers," American Society for Testing Materials, Fisher, March 2, 1944, p. 13.